United States Patent [19]
Jayawant et al.

[11] Patent Number: 5,101,130
[45] Date of Patent: Mar. 31, 1992

[54] MAGNETIC THRUST BEARINGS

[75] Inventors: Richard A. C. Jayawant, Lewes; Raymond J. Whorlow, Brighton, both of England

[73] Assignee: Glacier Metal Company Limited, Middlesex, England

[21] Appl. No.: 358,140

[22] Filed: May 30, 1989

[30] Foreign Application Priority Data

Jun. 2, 1988 [GB] United Kingdom ............... 8813019

[51] Int. Cl.$^5$ ............................................. H02K 7/09
[52] U.S. Cl. .................................................. 310/90.5
[58] Field of Search ...................................... 310/90.5

[56] References Cited

U.S. PATENT DOCUMENTS

| | | | |
|---|---|---|---|
| 3,356,425 | 12/1967 | Carriere | 310/90.5 |
| 3,791,704 | 2/1974 | Perper | 310/90.5 |
| 3,865,442 | 2/1975 | Studer | 310/90.5 |
| 3,890,019 | 6/1975 | Boden | 310/90.5 |
| 3,909,082 | 9/1975 | Ishikawa | 310/90.5 |
| 4,527,802 | 7/1985 | Wilcock | 310/90.5 |
| 4,652,780 | 3/1987 | Murakami | 310/90.5 |
| 4,652,820 | 3/1987 | Maresca | 310/90.5 |
| 4,710,656 | 12/1987 | Studer | 310/51 |
| 4,956,571 | 9/1990 | Gordon | 310/90.5 |

FOREIGN PATENT DOCUMENTS

| | | |
|---|---|---|
| 2355104 | 5/1975 | Fed. Rep. of Germany . |
| 2052314 | 4/1971 | France . |
| 0160626 | 7/1966 | Japan ................... 310/90.5 |
| 0065417 | 4/1982 | Japan ................... 310/90.5 |
| 0028014 | 2/1983 | Japan ................... 310/90.5 |
| 59-19714 | 2/1984 | Japan . |
| 1190113 | 11/1985 | U.S.S.R. ............... 310/90.5 |
| 1471843 | 4/1977 | United Kingdom . |
| 1597720 | 9/1981 | United Kingdom . |

Primary Examiner—R. Skudy
Attorney, Agent, or Firm—Nixon & Vanderhye

[57] ABSTRACT

Axial magnetic bearings are described suitable for use where high loads and high rotational speeds are found together. The bearings comprises an assembly where, for thrusts along the shaft in one direction, the shaft has, in relation thereto, two axially spaced, and radially extending, thrust accepting faces, a generally channel-shaped, annular electromagnet surrounding the shaft, with a radially extending face of each pole of the electromagnet adjacent to an individually associated thrust face.

5 Claims, 3 Drawing Sheets

MAGNETIC THRUST BEARINGS

BACKGROUND AND SUMMARY OF THE INVENTION

The present invention relates to magnetic bearings for accepting axial thrust loads.

In an axial magnetic bearing the configuration is generally such that a solid, circular ferromagnetic disc., secured to a shaft, is used for the rotor of the bearing. Annular electromagnetic structures are generally sited on each side of an adjacent the disc and, depending upon the thrust direction, one or other of the electromagnets structure balances out thrust forces along the shaft axis. This is achieved by a control system which varies the current to the electromagnet structure in order to maintain a substantially constant gap between the magnet and disc face.

The diameter of the disc has generally been dictated by the magnitude of the axial load which it is necessary to counteract.

Where the anticipated rotational speed of the shaft and disc is very high and is also allied with high thrust loads the stresses generated in the rotating disc may exceed the mechanical strength of the ferromagnetic material from which it is made.

It is an object of the present invention, therefore, to provide an axial magnetic bearing assembly in which, in operation, there are lower induced stresses within each provided thrust bearing member, than for a conventional axial magnetic bearing assembly capable of accepting the same anticipated maximum thrust.

It is another object of the present invention to provide an axial magnetic bearing assembly extending less in a radial direction than a conventional axial magnetic bearing assembly capable of accepting the same anticipated maximum thrust.

According to the present invention a magnetic bearing assembly has a rotatable arrangement, at least including a shaft, and, possibly, one or two additional parts secured to the shaft, ferromagnetic material of the rotatable arrangement both provides, in relation to the shaft axis, two axially spaced, and radially extending, faces to accept thrusts along the shaft in one direction, and extends completely between the two thrust faces, and the assembly also has a magnetic circuit comprising the ferromagnetic material between the two thrust faces, and an electromagnet, the electromagnet has an annular coil and an annular, ferromagnetic core, both the coil and the core being coaxial with the shaft, the coil is located in a channel provided in the core surface opposite to the shaft, and each pole has a radially extending face opposite to, and spaced from, an individually associated thrust face of the two radially extending thrust faces.

Whether the shaft comprises the sole, or a constituent, part of the rotatable arrangement, it may be of ferromagnetic material. When the shaft is of ferromagnetic material, each thrust face may be provided, individually, by a thrust collar, either the thrust collars being machined from the shaft material, or initially separate thrust collars of ferromagnetic material being secured to the shaft.

Preferably ferromagnetic material providing at least one of the thrust faces is tapered in the radially outward direction to reduce the mass thereof.

Preferably at least one of the poles of the electromagnet structure is tapered in the radially inward direction to minimise flux leakage into the shaft.

It has been found with axial magnetic bearings according to the present invention that the form of each electromagnet structure used allows the use of larger coil windings than is conventional in such an assembly. This gives rise to lower power or current consumption leading to correspondingly lower heat dissipation requirements.

BRIEF DESCRIPTION OF THE DRAWINGS

In order that the present invention may be more fully understood examples will now be described by way of illustration only with reference to the accompanying drawings, of which.

DETAILED DESCRIPTION OF THE DRAWINGS

Figure 1:
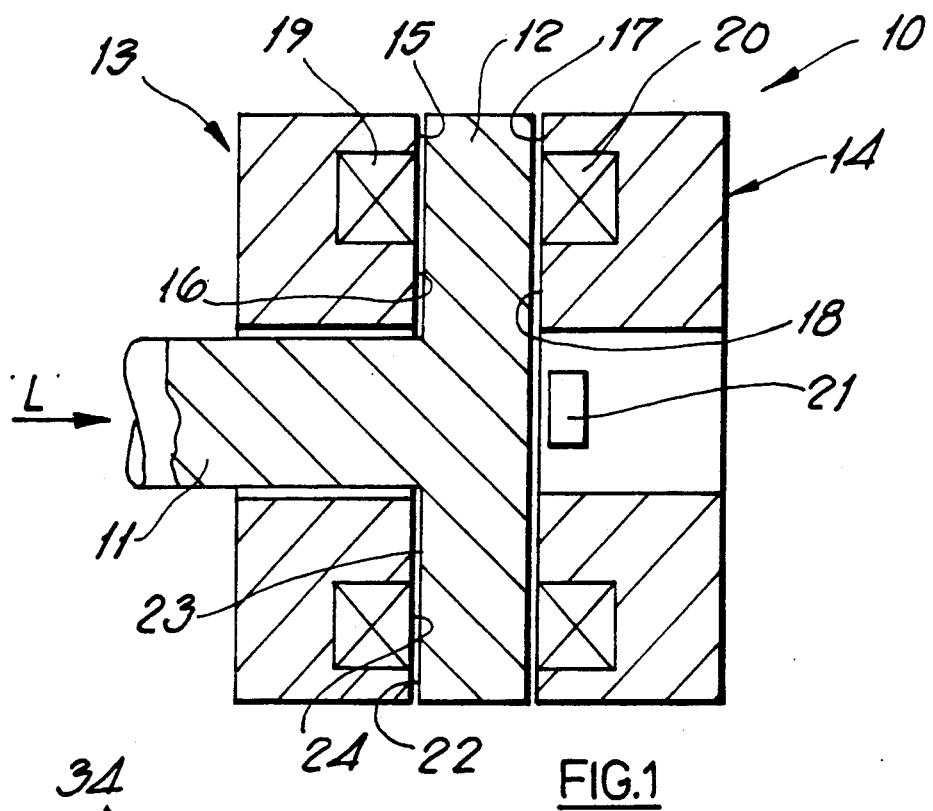
FIG. 1 shows a schematic section through a prior art axial magnetic thrust bearing, capable of balancing thrust forces in both possible directions along the shaft axis.

Referring to FIG. 1 where a conventional axial magnetic thrust bearing is indicated generally at 10. The bearing assembly comprises a shaft 11 which is supported by either conventional mechanical journal bearings (not shown) or radial magnetic bearings (not shown). The shaft has a rotor disc 12 which is shown at the shaft end but may be intermediate the shaft. Two stationary annular electromagnets 13 and 14 are shown. The magnets 13 and 14 comprise equal pole face areas 15, 16 and 17, 18 together with annular coils 19, 20. An external thrust load, "L", is applied to the shaft in the direction of the arrow. An axial position sensor 21 senses the axial position of the rotor disc 12 and via a known control system (not shown) the current to the coil 19 of the electro magnet 13 is varied to maintain the clearance 22 between the rotor face 23 and the face 24 of the electro magnet 13 substantially constant. The second electro magnet 14 only comes into operation if the direction of the applied thrust load is reversed for some reason.

The thrust capacity of the bearing is largely dictated by the face area of the electromagnets which in turn dictates the diameter of the rotor disc 12. Where both the axial thrust requirement and the rotational speeds are high the stresses generated at the disc periphery may exceed the strength of the disc material and cause it to burst.

Figure 2:
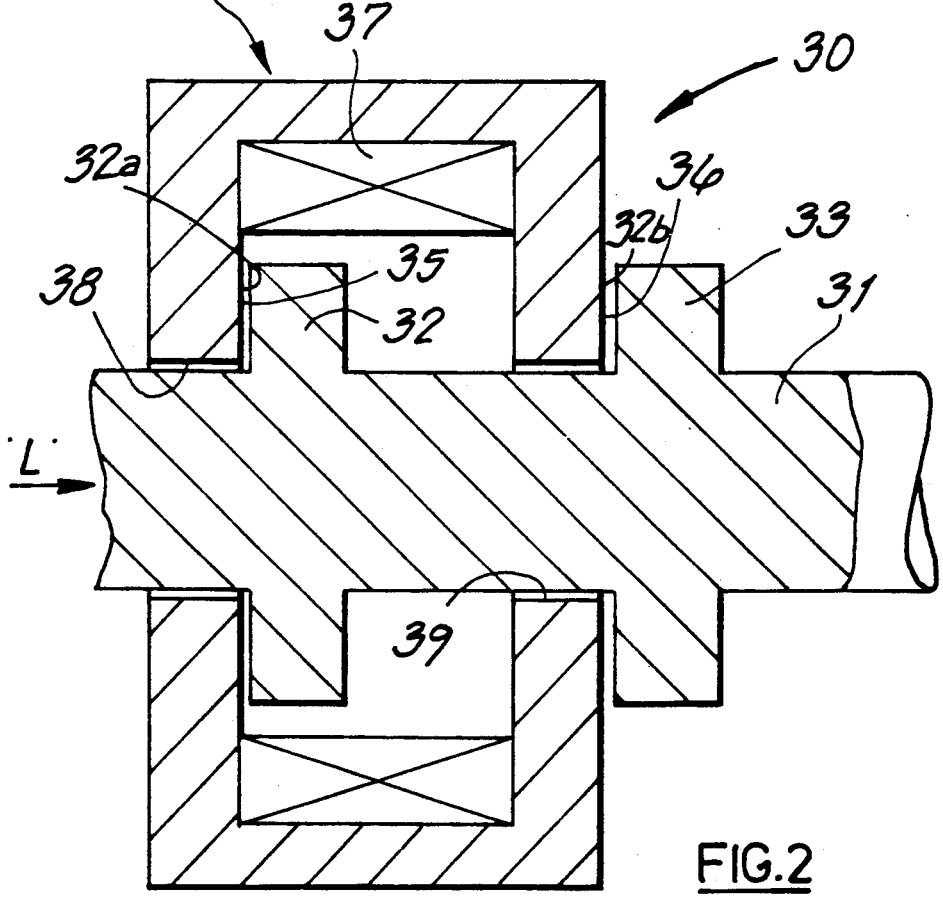
FIG. 2 shows a schematic section through an axial magnetic bearing according to the present invention, capable of balancing thrust forces in one possible direction along the shaft axis thereby providing an axial unidirectional magnetic thrust bearing assembly.
Figure 3:
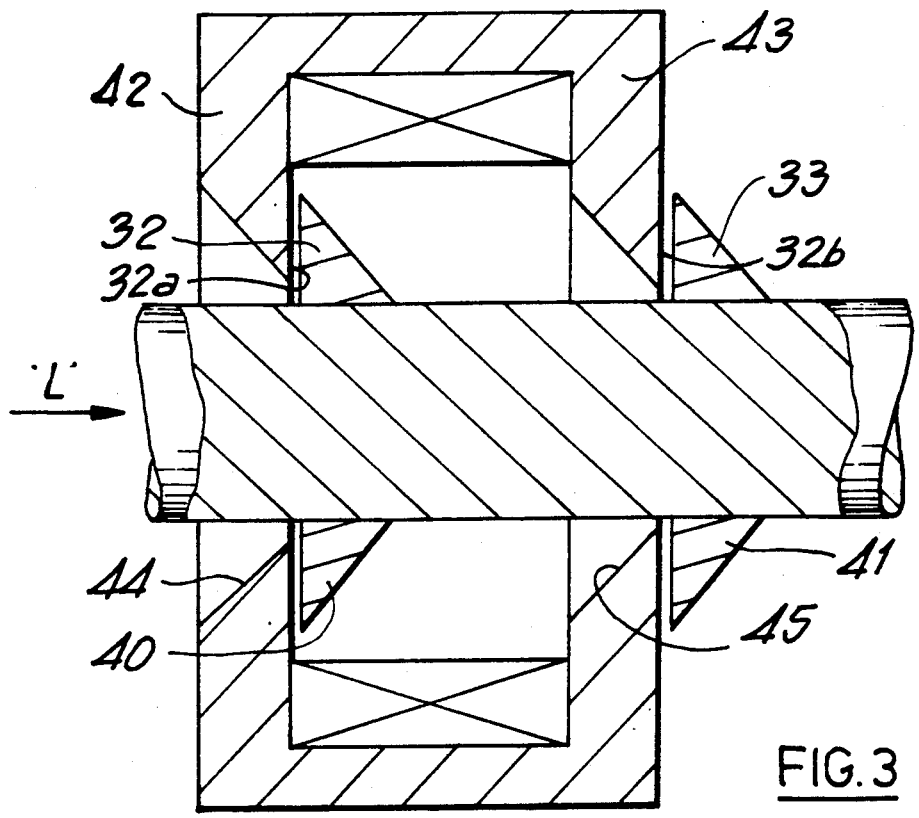
FIG. 3 shows a modification of the bearing of FIG. 2.

FIG. 2 shows a magnetic thrust bearing according to the present invention and which overcomes the disadvantages of the prior art thrust bearing. The bearing assembly shown generally at 30 comprises a shaft 31 having two collars 32, 33 defining thrust faces facing in one axial direction, the collars being either machined from the shaft material as shown in FIG. 2, or attached thereto as shown in FIG. 3. The shaft is made from a ferromagnetic material such as ferritic stainless steel. An annular channel-section electromagnet 34 having pole faces 35 and 36, facing in an opposite axial direction to the direction faced by the thrust faces of collars 32, 33, and an annular coil 37 surrounds the shaft 31. Annular electromagnet 34 is thus shaped to define an annulus having an annular chamber for receiving annular coil 37 and which annular chamber opens radially inwardly toward shaft 31 as illustrated in FIG. 2. The external applied thrust load, "L", is in the direction of the arrow.

In this case the total electromagnet pole face areas may be equal to that shown in FIG. 1 for electromagnet 13. The thrust load, however, is accepted by two collars 32 and 33 of considerably smaller diameter than the disc 12. The available volume for the coil 37 is also considerably greater than in the electromagnet 13. This allows lower power to be used for any given force to be generated and thus results in less heat to be dissipated. The circuit for the magnet flux flows through the shaft surface since it is ferromagnetic.

Thus, the electromagnet 34 includes a channel-shaped core having a pair of cooperating, axially spaced pole faces 35 and 36 in opposition to the thrust faces of collars 32 and 33, respectively, thereby defining a gap therebetween. Coil 37 thus establishes an electromagnetic circuit including the gap between the opposed thrust and pole faces.

Also note that the pole faces 35 and 36 have the thrust face of collar 32 therebetween and that the thrust face of the other collar 33 is located axially along shaft 31 beyond both pole faces.

FIG. 3 shows a modification of the bearing of FIG. 2, the modifications improving the efficiency of the bearing. Firstly the collars 32 and 33 have an annular taper 40,41 to reduce still further the forces generated during rotation by reduction in the mass at the outer peripheries of the collars. Secondly, the radially inwardly directed pole pieces 42 and 43 of the electromagnet 34 have an annular tapers 44,45. This minimises flux leakage, which is equivalent to a reduction in the thrust capacity, directly from the faces 38 and 39 (FIG. 2) into the shaft. As illustrated in FIGS. 2 and 3, thrust face 32a and 32b extend radially outwardly from the shaft and terminate at substantially like radial dimensions.

Figure 4:
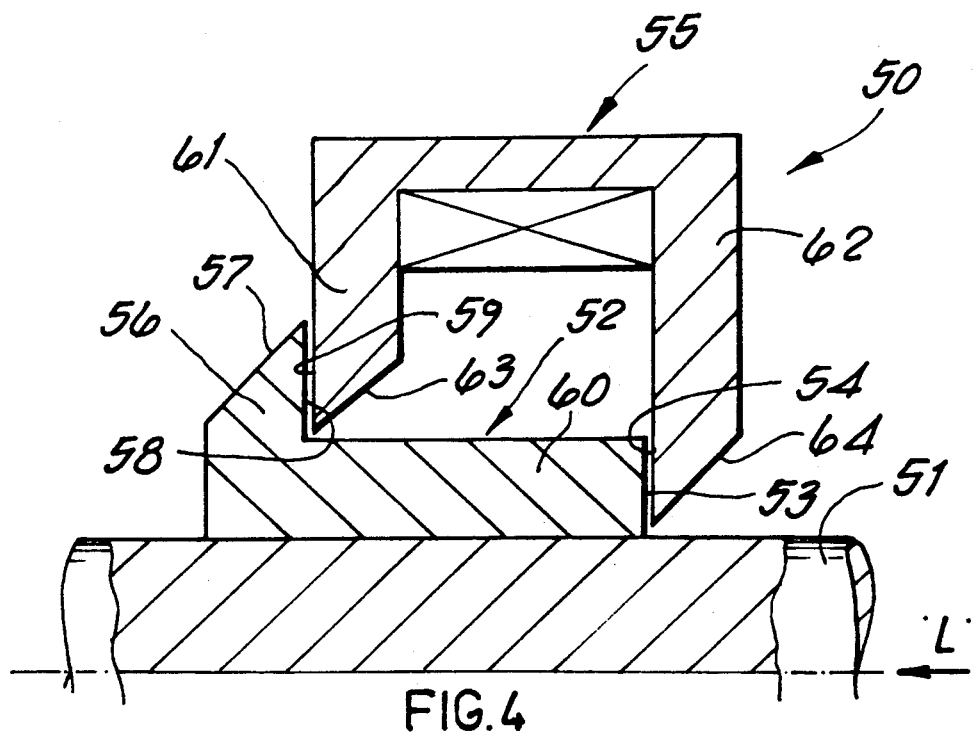
FIG. 4 shows an alternative bearing according to the present invention.

FIG. 4 shows an alternative embodiment 50 where, for example, the shaft 51 may be magnetically non-permeable. In this case a ferromagnetic, annular sleeve 52 is attached to the shaft. The sleeve has a rear face 53 forming a thrust face for cooperating with a pole face 54 of an electromagnet 55 and a radially extending flange or disc 56 having an annular taper 57 in the radially outward direction to minimise generated forces during rotation thus sleeve 52 provides annular thrust faces. The flange face 58 forms a thrust face for cooperating with the second pole face 59 of the electromagnet 55 the magnetic flux flowing through the axially extending cylindrical body 60 of the sleeve 52 to complete the magnetic circuit. The pole pieces 61 and 62 again have annular tapers 63 and 64 to minimise flux leakage in undesirable directions. Thus, at least one of the faces of pole pieces 61 or 62 is tapered in a radially outward direction.

All embodiments shown in FIGS. 2, 3 and 4 have known control systems employing axial position sensors and closed loop feed back control circuitry to control the power applied to the electromagnets in order to maintain substantially constant clearance between each electromagnet pole face and the associated rotor or collar thrust face. Thus, the electromagnetic structure establishes an electromagnetic circuit, including the gap between the opposed thrust and pole faces whereby in response to unidirectional axial thrust loads on the shaft, the gap between each opposed thrust and pole faces is maintained substantially constant.

Figure 5:
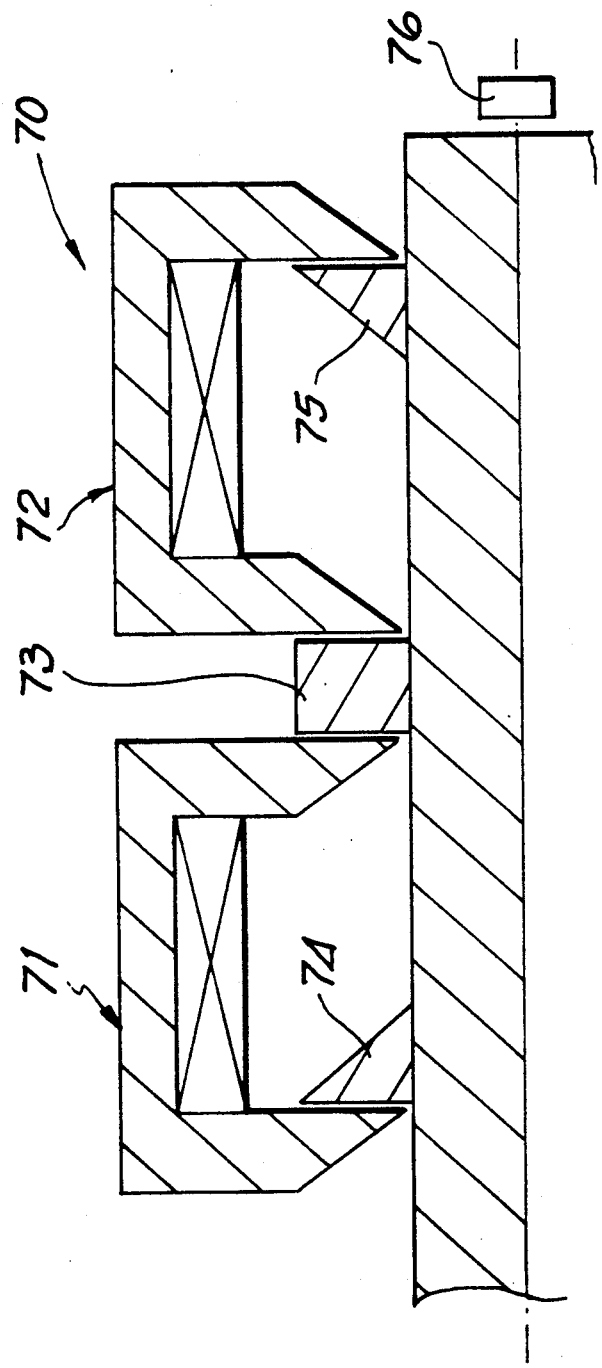
FIG. 5 which shows an arrangement to accept thrust loads where the thrust direction may change.

FIG. 5 shows an arrangement 70 where the reversal of the direction of the applied thrust load may be accommodated. The arrangement comprises two electromagnets 71 and 72 which both act upon a common thrust collar 73 depending upon the thrust direction. That is, the two annular electromagnets 71 and 72 surround the shaft and are adapted to provide thrust in opposition to one another. Collars 74 and 75 are also provided and which are dedicated to a particular thrust direction. A position sensor 76 allied to known control circuitry is also provided.

We claim:

1. An axial unidirectional magnetic thrust bearing assembly comprising a shaft provided with a pair of axially spaced, radially extending thrust faces facing in one axial direction; an annular electromagnetic structure mounted coaxially with respect to said shaft including coil means, said electromagnetic structure having an annular ferromagnetic core shaped to define an annulus having an annular chamber for receiving said coil means and which chamber opens radially inwardly toward said shaft; said core providing a pair of cooperating, axially spaced pole faces facing in an axial direction opposite to said one axial direction and in opposition to said thrust faces, respectively, thereby defining a gap between each opposed thrust face and associated pole face, one of said pair of thrust faces being located axially between said pole faces and another of said pair of thrust faces located axially beyond said pair of pole faces, said electromagnetic structure establishing an electromagnetic circuit including the gap between each opposed thrust and pole faces, whereby, in response to unidirectional axial thrust loads on said shaft, the gap between each opposed thrust and pole faces is maintained substantially constant.

2. An axial unidirectional magnetic thrust bearing assembly according to claim 1 wherein said coil means comprises a single annular coil.

3. An axial unidirectional magnetic thrust bearing assembly according to claim 1 wherein said core spans axially between said thrust faces.

4. An axial unidirectional magnetic thrust bearing assembly according to claim 1 wherein said thrust faces extend radially outwardly from said shaft and terminate at substantially like radial distances from said shaft.

5. An axial bidirectional magnetic thrust bearing assembly comprising a shaft having first and second pairs of axially spaced, radially extending thrust faces with the thrust faces of said first pair of axially spaced, radially extending thrust faces facing in a first axial direction and the thrust faces of said second pair of biaxially spaced, radially extending thrust faces facing in a second axial direction opposite said first axial direction; first and second annular electromagnetic structures mounted coaxially with respect to said shaft including respective first and second coil means, said electromagnetic structures having respective first and second annular ferromagnetic cores, each core being shaped to define an annulus having an annular chamber for receiving an associated coil means and which chamber opens radially inwardly toward said shaft, said cores having respective first and second pairs of axially spaced pole faces, said first pair of axially spaced pole faces facing in said second axial direction and lying in respective spaced opposition to said first pair of axially spaced, radially extending thrust faces to define respective gaps therebetween, said second pair of axially spaced pole faces facing in said first axial direction and lying in respective spaced opposition to said second pair of axially spaced, radially extending thrust faces to define respective gaps therebetween, said first and second annular electromagnetic structures establishing respective electromagnetic circuits including the gaps between (i) opposed thrust and pole faces of said first pair of axially spaced, radially extending thrust faces and said first pair of axially spaced pole faces, and (ii) the opposed thrust and pole faces of said second pair of axially spaced, radially extending thrust faces and said second pair of axially spaced pole faces whereby, in response to axial loads on said shaft, the gaps between each opposed thrust and pole faces are maintained substantially constant, said first pairs of axially spaced, radially extending thrust and pole faces being axially spaced from said second pairs of axially spaced, radially extending thrust and axially spaced pole faces.

* * * * *